United States Patent Office 3,348,887
Patented Oct. 24, 1967

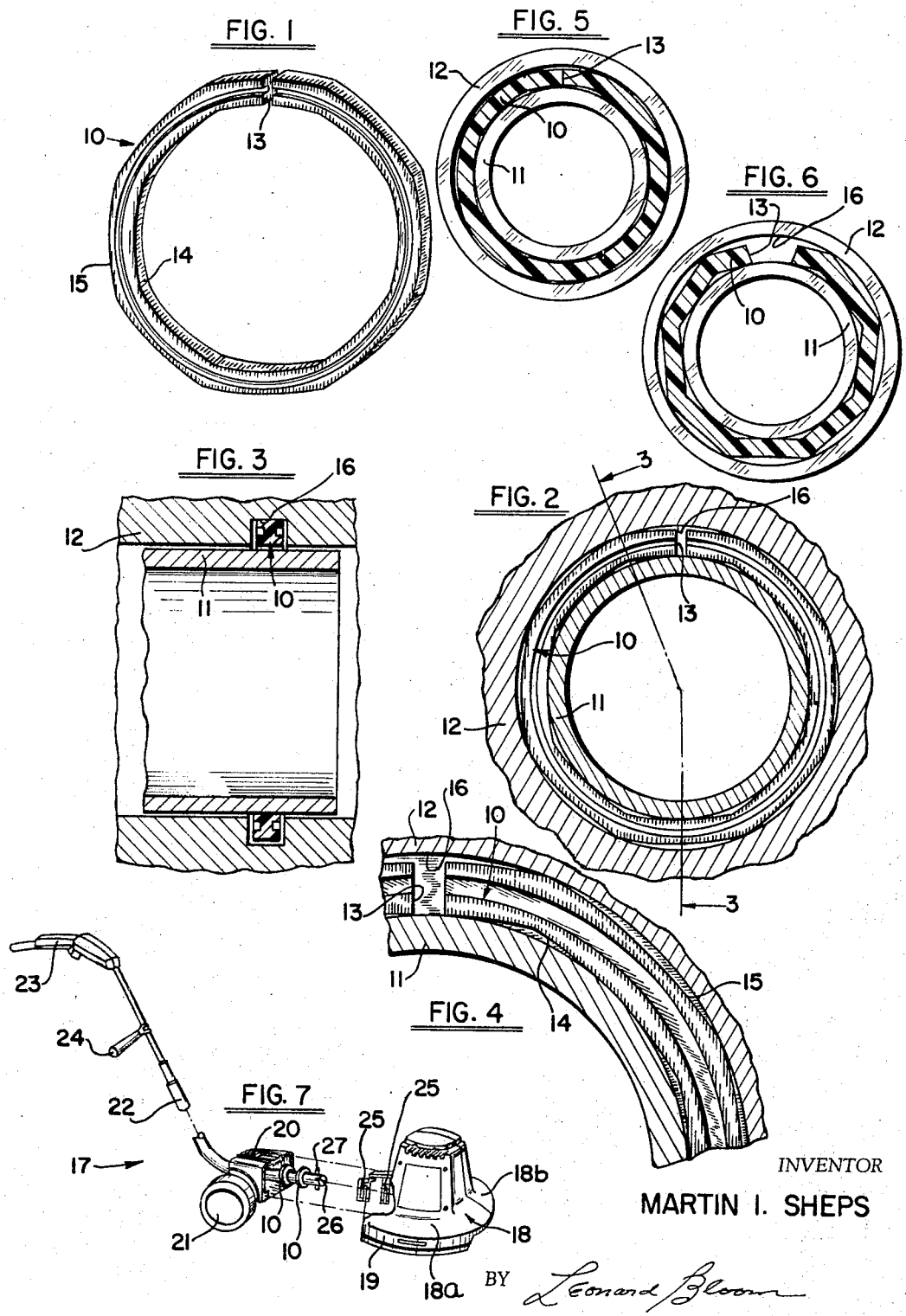

3,348,887
COMBINATION TOLERANCE RING AND
BEARING JOURNAL MEMBER
Martin I. Sheps, Baltimore County, Md., assignor to The Black and Decker Manufacturing Company, Towson, Md., a corporation of Maryland
Filed Mar. 4, 1965, Ser. No. 437,030
1 Claim. (Cl. 308—26)

The present invention relates to a combination tolerance ring and bearing journal member, and more particularly, to an integrally-molded relatively-inexpensive member which is disposed radially between a pair of concentric members, the latter comprising an inner member and an outer member having relative rotation therebetween.

In accordance with the broad teachings of the present invention, there is herein illustrated and described, a generally-annular member, preferably split, formed from an anti-friction material, and having a plurality of side wall portions in limited contact with the inner and outer concentric members, respectively, whereby the split member serves as a bearing journal for the concentric members. In addition, the split member is inherently capable of deforming (to a desired degree) in order to compensate for misalinements in the concentricity of the inner and outer members as well as diametral tolerance accumulations therebetween.

Preferably, the split member is substantially octagonal, has an H-shaped cross-section, and is conveniently molded from a suitable type of plastic material.

These and other objects of the present invention will become apparent from a reading of the following specification, taken in conjunction with the enclosed drawings, in which:

FIGURE 1 is a perspective of the combination tolerance ring and bearing journal member of the present invention, hereinafter referred to as the "ring member";

FIGURE 2 is an elevation of the ring member as it is disposed radially between the inner and outer concentric members, the concentric members being shown in section;

FIGURE 3 is a section view taken along the lines 3—3 of FIGURE 2, showing the manner in which the ring member is preferably disposed within an internal annular groove formed within the outer member;

FIGURE 4 is an enlarged fragmentary portion of FIGURE 2, showing how the inner and outer side wall portions of the ring member have a limited contact or engagement with the inner and outer concentric members, respectively;

FIGURE 5 is a section view of the ring member showing the manner in which the ring member is closed and deformed between the concentric members, the latter members being disposed relatively close to one another;

FIGURE 6 is another section view of the ring member, corresponding substantially to that of FIGURE 5, but showing the manner in which the ring member is opened and deformed between the concentric members, the latter members being disposed further away from each other than that of FIGURE 5; and FIGURE 7 is an exploded perspective showing a typical application of the ring member, illustrating its particular utility.

With reference to the drawings, there is illustrated a generally-annular ring member 10 which serves a dual function: one, as a tolerance ring, and two, as a bearing journal member between an inner member 11 and an outer member 12, the latter being substantially concentric to one another. The ring member 10 is preferably integrally-molded from a polyamide type of material, such as "nylon." Preferably, but not necessarily, the member 10 is substantially octagonal and has an H-shaped cross-section, as shown more particularly in FIGURE 3.

The ring member 10, as shown more particularly in FIGURES 2–4, is disposed radially between the pair of concentric members 11, 12 which are adapted to have a degree of relative rotation therebetween. Inasmuch as the ring member 10 is formed from an anti-friction type of material, such as "nylon," it serves as an inexpensive and convenient bearing journal member between the concentric members 11 and 12.

Moreover, the ring member 10 is preferably split, as at 13, and this, in combination with its inherent resiliency, allows the ring member 10 to deform in order to compensate for misalinements in the concentricity of the inner and outer members 11 and 12 as well as diametral, that is, radial tolerance accumulations therebetween. The term "radial tolerance accumulations" (or "dimetral tolerance accumulations") is used by those skilled in the art to indicate the extent to which the radial spacing or clearance between the members 10 and 11 may vary from one production unit (or assembly) to another. Two extreme conditions illustrating the deformation of the ring member 10 are illustrated, somewhat schematically, in FIGURES 5 and 6. In FIGURE 5, the concentric members 11 and 12 are relatively close to one another, as would occur if the outer diameter of the inner member 11 was on the "high" side while the inner diameter of the outer member 12 was on the "low" side, and hence the ring member 10 is deformed to a limited degree, and in effect, more approaches a truly annular (or circular form) with its split portion 13 being joined together. Conversely, as shown in FIGURE 6, the concentric members 11 and 12 are spaced radially a greater degree from each other; and in this case, which represents the other extreme condition, the ring member 10 is again deformed in compensating for the greater spacing between the concentric members, with the split portion 13 of the ring member 10 being opened to a greater degree than its normal condition.

In addition to compensating for diametral tolerance accumulations between the concentric members 11 and 12, the ring member 10 is also capable of compensating for misalinements in the concentricity of the members, or both. The ring member 10 therefore functions, not only as an inexpensive bearing journal member, but also, as a tolerance ring.

As shown more particularly in FIGURE 4, the ring member 10 has an inner side wall (or walls) 14 and an outer side wall (or walls) 15, the walls having a limited contact or engagement with the inner and outer members 11 and 12, respectively. In this manner, the ring member 10 effectively journals the members 11 and 12 with respect to each other while preventing any frictional "drag" or "bind" therebetween, yet simultaneously compensates for tolerance accumulations between the members.

Preferably, the ring member 10 has an H-shaped cross-section, see FIGURE 3, for molding convenience, and is received within an internal annular groove 16 formed within the outer member 12.

A particular application illustrating the inherent utility of the teachings of the present invention is shown in FIGURE 7. Here, a power-operated lawn trimmed-edger 17 is shown in exploded perspective. This unit is adapted for either lawn trimming or lawn edging operations and includes a motor housing 18 provided with an annular peripheral skirt 19. The skirt partially encloses a rotary blade (not shown) and the axis of the blade may be disposed either vertically or horizontally, depending upon the operation to be performed. A wheel housing 20 is disposed rearwardly of the motor housing, and a pair of wheels are mounted on a transverse axle carried by the wheel housing, one of the wheels being illustrated as at 21.

An elongated handle 22, which is preferably tubular, is secured to the wheel housing, and the handle is provided with an upper control handle 23 and an auxiliary hand grip 24 so as to facilitate a convenient manual control and use of the machine. Preferably, the motor housing is split longitudinally into a pair of complementary mating halves comprising a "top" half 18a and a "bottom" half 18b. In FIGURE 7, the top half 18a has been partially broken away to illustrate a pair of semi-annular spaced-apart bearing seats 25 formed in the bottom half 18b. It will be appreciated by those skilled in the art that the top half is likewise formed with a pair of complementary semi-annular seats; and thus, when the mating halves are joined together, a pair of generally-annular spaced-apart bearing seats are formed in the motor housing, each of which correspond substantially to the internal annular groove 16 provided in the outer member 12. Moreover, the handle of the lawn trimmer-edger has a bent cylindrical portion 26 which is received within the rearward portion of the motor housing and is retained by means of a pin 27; and a pair of ring members 10, such as are illustrated herein, are carried on the cylindrical portion of the handle and are received within the respective bearing seats formed in the motor housing. This provides a convenient and economical journal for the motor housing with respect to the wheel housing and the elongated handle of the unit, and thus facilitates a circumferential indexing of the motor housing when the unit is to be used for a different operation. Further, and as previously described, the ring members 10 have a degree of inherent resiliency, and are thus capable of being deformed in order order to compensate for various misalinements and tolerance accumulations between the bent cylindrical portion 26 of the handle 22 and the mating halves 18a and 18b of the motor housing. Consequently, a convenient relatively-inexpensive journal is provided without requiring any expensive machining operations or an assembly to close tolerances.

For a more detailed description of the lawn trimmer-edger 17, reference is made to the co-pending Sheps et al. application, Ser. No. 442,908, filed Mar. 26, 1965, entitled "Power-Operated Law Trimmer-Edger," and assigned to the assignee of the present invention.

In the trimmer-edge 17, two ring members 10 are used for greater lateral stability of the handle portion 26 about its axis; however, the teachings of the present invention are equally applicable to the use of any plurality of ring members, as well as various other applications.

Obviously, many modifications may be made without departing from the basic spirit of the present invention; and accordingly, within the scope of the appended claim, the invention may be practiced other than has been specially described herein.

I claim:

In an electric tool, the combination of:

(a) a housing provided with a cylindrical bore having a pair of internal annular grooves formed therein; said grooves being spaced axially from one another;
(b) a pair of rings seated within the respective grooves;
(c) said rings each comprising a single molded-plastic polygonally-shaped loop having an outer surface and an inner surface, each of which surfaces is characterized by a plurality of corners separated by flat sides;
(d) the corners on the outer surface of each ring being in engagement with a respective internal annular groove in the housing; the respective inner surfaces of said rings extending radially inwardly into the cylindrical bore in the housing;
(e) an indexing cylindrical member pivotably mounted within the bore in the housing and adapted for occasional, limited relaive rotation therein; said cylindrical member having a smooth uninterrupted outer surface which is at least in engagement with the respective flat sides on the respective inner surfaces of the rings;
(f) each of said rings being inherently capable of deforming in order to compensate for misalinements in the concentricity of the pivotably-mounted cylindrical member in relation to the bore in the housing, as well as diametral tolerance accumulations therebetween;
(g) whereby said rings fulfill the dual function of combined tolerance rings and bearing journals for the pivotably-mounted cylindrical member within the housing, and whereby the pair of axially-spaced rings provide a lateral stability for the cylindrical member.

References Cited

UNITED STATES PATENTS

| | | | |
|---|---|---|---|
| 2,388,841 | 11/1945 | Goodwin | 85—8.8 |
| 2,828,985 | 4/1958 | Ridenour | 308—237 X |
| 2,987,349 | 6/1961 | Kretzmer | 308—72 |
| 3,056,637 | 10/1962 | Shanley et al. | 308—238 |
| 3,097,893 | 7/1963 | White | 308—26 |
| 3,122,399 | 2/1964 | Hunter | 308—26 |
| 3,144,919 | 8/1964 | Foote et al. | 308—238 X |
| 3,263,907 | 8/1966 | Van Nimwegen et al. | 308—26 |

FOREIGN PATENTS 700,428   12/1930   France.

EDGAR W. GEOGHEGAN, *Primary Examiner.*

MARTIN P. SCHWADRON, *Examiner.*

R. F. HESS, *Assistant Examiner.*